United States Patent
Miura et al.

(10) Patent No.: US 10,627,160 B2
(45) Date of Patent: Apr. 21, 2020

(54) VACUUM DRYING APPARATUS AND VACUUM DRYING METHOD

(71) Applicants: ULVAC, INC., Chigasaki-shi, Kanagawa (JP); NATIONAL UNIVERSITY CORPORATION, IWATE UNIVERSITY, Morioka-shi, Iwate (JP)

(72) Inventors: Makoto Miura, Morioka (JP); Takuya Morikawa, Morioka (JP); Norihisa Takada, Morioka (JP); Tsuyoshi Yoshimoto, Chigasaki (JP); Takashi Hanamoto, Chigasaki (JP); Yoichi Ohinata, Chigasaki (JP)

(73) Assignees: ULVAC, INC., Chigasaki-Shi, Kanagawa (JP); NATIONAL UNIVERSITY CORPORATION, IWATE UNIVERSITY, Morioka-Shi, Iwate (JP)

( * ) Notice: Subject to any disclaimer, the term of this patent is extended or adjusted under 35 U.S.C. 154(b) by 0 days.

(21) Appl. No.: 16/536,885

(22) Filed: Aug. 9, 2019

(65) Prior Publication Data
US 2019/0360748 A1      Nov. 28, 2019

Related U.S. Application Data

(63) Continuation of application No. PCT/JP2018/004376, filed on Feb. 8, 2018.

(30) Foreign Application Priority Data

Feb. 9, 2017    (JP) .................. 2017-021984

(51) Int. Cl.
*F26B 5/04*    (2006.01)
*F26B 3/06*    (2006.01)
*F26B 21/10*   (2006.01)

(52) U.S. Cl.
CPC .............. *F26B 5/04* (2013.01); *F26B 3/06* (2013.01); *F26B 21/10* (2013.01); *A23V 2002/00* (2013.01)

(58) Field of Classification Search
CPC .... F26B 21/10; F26B 3/06; F26B 9/06; F26B 5/04; A23V 2002/00
(Continued)

(56) References Cited

U.S. PATENT DOCUMENTS 2,765,236 A * 10/1956 Blaine, Jr. ................. A23F 5/32
                                                            426/385
3,199,217 A *  8/1965 Oldenkamp .............. A23L 3/44
                                                             34/92

(Continued)

FOREIGN PATENT DOCUMENTS

JP    2002-333103 A    11/2002
JP    2005-287373 A    10/2005
(Continued)

OTHER PUBLICATIONS

International Search Report in International Application No. PCT/JP2018/004376, filed Feb. 8, 2018.
(Continued)

*Primary Examiner* — Edelmira Bosques
*Assistant Examiner* — Bao D Nguyen
(74) *Attorney, Agent, or Firm* — Saliwanchik, Lloyd & Eisenschenk (57) ABSTRACT

A vacuum drying apparatus includes a chamber, a steam supply line, an evacuation line, a circulation line, and a pressurizing and heating unit. The chamber includes an inlet, an outlet, and a treatment space capable of accommodating food. The steam supply line is connected to the inlet and is configured to be capable of supplying steam into the treatment space. The evacuation line is connected to the outlet
(Continued)

and is configured to be capable of evacuating the treatment space. The circulation line is provided outside the chamber and causes steam to circulate from the outlet to the inlet. The pressurizing and heating unit is provided in the circulation line. The pressurizing and heating unit includes a pressurizer which includes a first pump and a flow channel diameter restrictor and pressurizes the steam, a heater which is provided between the first pump and the flow channel diameter restrictor and heats steam pressurized by the pressurizer, and a controller that controls at least one of the first pump or the flow channel diameter restrictor in accordance with a pressure of the heater.

6 Claims, 8 Drawing Sheets

(58) Field of Classification Search
USPC .................................................. 34/92
See application file for complete search history.

(56) References Cited

U.S. PATENT DOCUMENTS

| | | | | | |
|---|---|---|---|---|---|
| 3,230,633 | A | * | 1/1966 | Hamilton | F26B 5/06 34/289 |
| 3,453,741 | A | * | 7/1969 | Clark | A23L 3/44 34/290 |
| 3,718,485 | A | * | 2/1973 | Lankford | A23L 5/11 426/438 |
| 3,921,309 | A | * | 11/1975 | Nakayashiki | F26B 5/04 34/380 |
| 4,187,616 | A | * | 2/1980 | Yamada | C04B 40/02 34/394 |
| 4,194,296 | A | * | 3/1980 | Pagnozzi | F26B 5/04 34/410 |
| 4,353,222 | A | * | 10/1982 | Kobayashi | A23L 3/44 62/268 |
| 4,447,965 | A | * | 5/1984 | Bray | D06F 58/02 34/416 |
| 4,644,664 | A | * | 2/1987 | Bradshaw | F26B 3/084 34/361 |
| 4,829,620 | A | * | 5/1989 | Christ | D06B 3/28 68/178 |
| 5,519,948 | A | * | 5/1996 | Raehse | B01D 1/18 34/347 |
| 2003/0007914 | A1 | * | 1/2003 | Ongaro | A61L 2/07 422/292 |
| 2003/0007915 | A1 | * | 1/2003 | Ongaro | A61L 2/07 422/297 |
| 2013/0061492 | A1 | * | 3/2013 | Okuchi | F26B 7/00 34/402 |

FOREIGN PATENT DOCUMENTS

| | | | |
|---|---|---|---|
| JP | 2005287373 A | * | 10/2005 |
| JP | 2006-17353 A | | 1/2006 |
| JP | 2006017353 A | * | 1/2006 |
| JP | 5311248 B2 | | 10/2013 |

OTHER PUBLICATIONS

Office Action dated Oct. 25, 2019 in German Application No. 11 2018 000 387.6, along with its English translation.

* cited by examiner

VACUUM DRYING APPARATUS AND VACUUM DRYING METHOD

CROSS-REFERENCE TO RELATED APPLICATIONS

This application is a continuation of International Patent Application No. PCT/JP2018/004376, filed Feb. 8, 2018, which claims priority to Japanese Application No. 2017-021984, filed Feb. 9, 2017, the disclosures of each of which are incorporated herein by reference in their entirety.

BACKGROUND

The present technology relates to a vacuum drying apparatus and a vacuum drying method which can be applied to production of dried foods, for example.

Japanese Patent No. 5311248 (hereinafter, referred to as Patent Literature 1) has disclosed a technology of putting food in a hermetically-sealed apparatus and drying the food by exposing the food to circulating warm air under a pressure-reduced atmosphere produced by a vacuum pump.

SUMMARY

However, in Patent Literature 1, there is a problem in that moisture removed from the dried food is condensed and remains inside the apparatus, and thus balancing is performed at a steam partial pressure inside the apparatus and drying does not progress from such a balanced state. It is difficult to perform efficient food drying.

In view of the above-mentioned circumstances, the present technology has been made for providing a vacuum drying apparatus and a vacuum drying method which have good drying efficiency.

In accordance with an embodiment of the present technology, there is provided a vacuum drying apparatus including a chamber, a steam supply line, an evacuation line, a circulation line, and a pressurizing and heating unit.

The chamber includes an inlet, an outlet, and a treatment space capable of accommodating food.

The steam supply line is connected to the inlet and is configured to be capable of supplying steam into the treatment space.

The evacuation line is connected to the outlet and is configured to be capable of evacuating the treatment space.

The circulation line is provided outside the chamber and causes steam to circulate from the outlet to the inlet.

The pressurizing and heating unit is provided in the circulation line. The pressurizing and heating unit includes a pressurizer, a heater, and a controller. The pressurizer includes a first pump and a flow channel diameter restrictor and pressurizes the steam. The heater is provided between the first pump and the flow channel diameter restrictor and heats steam pressurized by the pressurizer. The controller controls at least one of the first pump or the flow channel diameter restrictor in accordance with a pressure of the heater.

The vacuum drying apparatus is configured to be capable of executing blanching treatment of causing steam to circulate between the treatment space at a normal pressure and the circulation line and drying treatment of causing steam to circulate superheated steam to circulate between the treatment space in which a pressure is reduced through the evacuation line and the circulation line.

In accordance with an embodiment of the present technology, there is provided a vacuum drying method including accommodating food in a treatment space inside a chamber.

Blanching treatment for the food is executed by causing steam to circulate between the treatment space at a normal pressure and a circulation line which is provided outside the chamber and causes steam to circulate from an outlet to an inlet of the chamber.

The treatment space is evacuated through an evacuation line.

Drying treatment for the food is executed by causing superheated steam, which is obtained by heating steam discharged from the treatment space in a pressurized state by a pressurizing and heating unit provided in the circulation line, to circulate between the treatment space at a reduced pressure and the circulation line.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
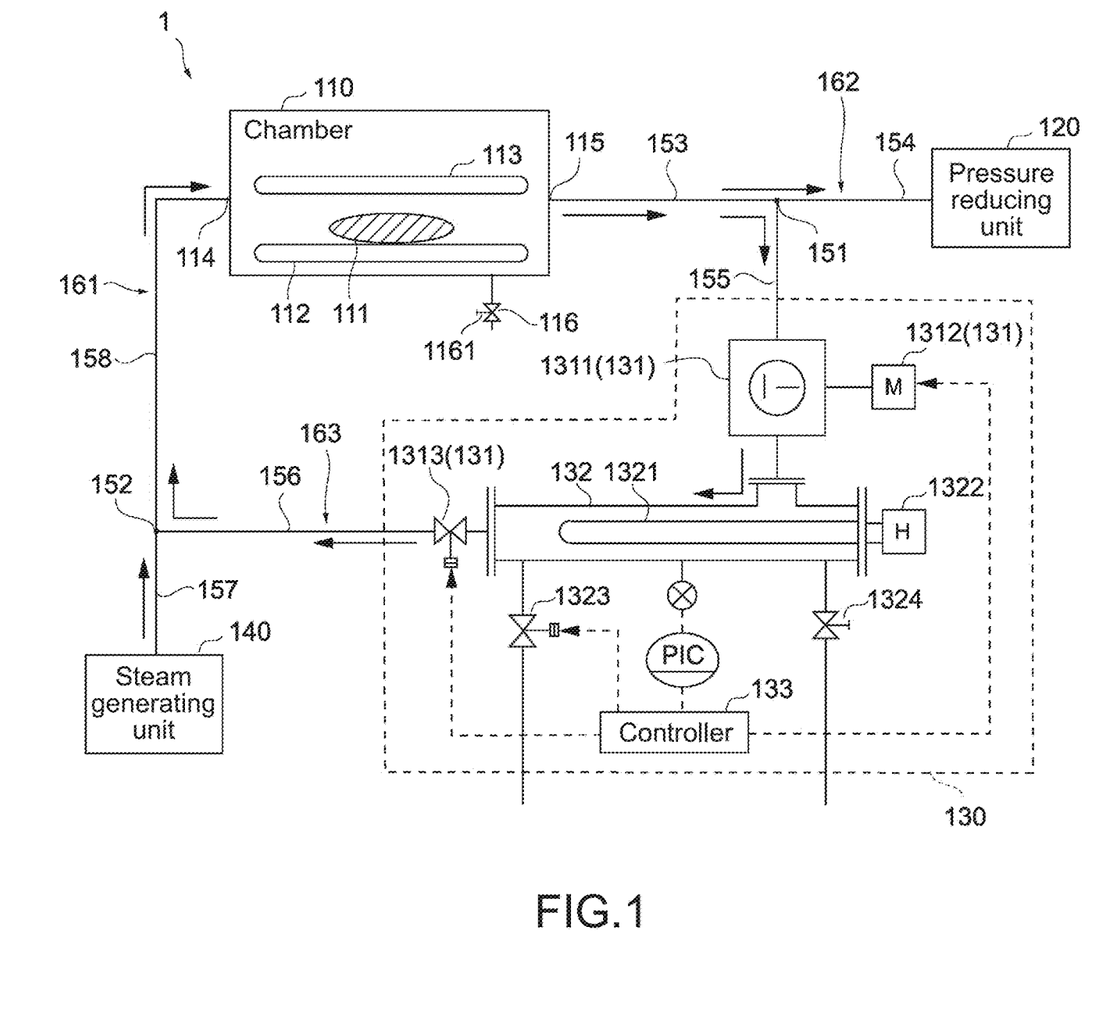
FIG. 1 is a functional block diagram showing a circuit configuration according to an embodiment of the present technology.

Hereinafter, an embodiment according to the present technology will be described with reference to the drawings.
Apparatus Configuration FIG. 1 shows a circuit configuration of a vacuum drying apparatus 1 according to this embodiment. As shown in FIG. 1, the vacuum drying apparatus 1 includes a chamber 110, a steam generating unit 140, a pressure reducing unit 120, and a pressurizing and heating unit 130. Further, as shown in FIG. 1, the vacuum drying apparatus 1 includes a steam supply line 161, an evacuation line 162, and a circulation line 163.

The chamber 110 includes an inlet 114 and an outlet 115 and has a treatment space capable of accommodating food 111. The chamber 110 further includes a drying shelf 112 on which the food 111 is disposed, a sheathed heater 113, and a drain 116. The chamber 110 is configured to be capable of keeping the treatment space under a predetermined pressure-reduced atmosphere. It should be noted that the chamber 110 also includes a door or lid (not shown) and the door or lid (not shown) is used for taking out the food 111 from the chamber 110 and putting the food 111 in the chamber 110.

During a drying process for the food 111, the sheathed heater 113 generates heat in such a manner that voltage is applied on the internal heating element, and adds thermal energy to gas and the food 111 in the treatment space inside the chamber 110. The food 111 is dried with superheated steam circulating through the circulation line 163. In drying, heat of evaporation (latent heat of vaporization of contained moisture) is removed from the food 111.

The sheathed heater 113 adds sensible heat to the food 111 by generating heat at approximately 30° C. to 40° C., for example, and promotes evaporation of moisture from the food 111. The means for adding sensible heat to the food 111 is not limited the sheathed heater 113. In addition to this, a means of increasing the temperature of the wall itself constituting the chamber 110 through a coil heater or the like to thereby add sensible heat to the food 111 can also be utilized.

The drain 116 is for discharging condensed water generated in the chamber 110, gas in the tube outside the vacuum drying apparatus 1. The drain 116 is provided below the chamber 110. The drain 116 includes a drain valve 1161. The drain valve 1161 also functions a vent valve. It should be noted that a configuration with which open/close of the drain valve 1161 may be controlled by a controller 133 may be employed. Further, a water recovering mechanism may be provided at a discharge destination of the drain 116.

The steam supply line 161 is connected to the inlet 114 of the chamber 110 and is configured to be capable of supplying steam into the treatment space of the chamber 110. The steam supply line 161 is constituted by a flow channel 157 in communication with the steam generating unit 140 and a flow channel 158 constituting a part of the circulation line 163. A position at which the steam supply line 161 is connected to the chamber 110, i.e., a position at which the inlet 114 is provided is set in an upper portion or upper wall surface of the chamber 110.

The evacuation line 162 is connected to the outlet 115 of the chamber 110 and is configured to be capable of evacuating the treatment space of the chamber 110. The evacuation line 162 is constituted by a flow channel 153 constituting a part of the circulation line 163 and a flow channel 154 in communication with the pressure reducing unit 120.

The circulation line 163 is provided outside the chamber 110 and causes steam to circulate from the outlet 115 to the inlet 114. The circulation line 163 is constituted by the flow channel 153, a flow channel 155, an internal flow channel of the pressurizing and heating unit 130, a flow channel 156, and the flow channel 158.

The pressurizing and heating unit 130 is provided in the circulation line 163 and includes a pressurizer 131 that pressurizes steam, a heater 132 that heats the pressurized steam, and the controller 133. In this embodiment, as shown in FIG. 1, the pressurizing and heating unit 130 includes a pressurizing pump 1311 (first pump) to be connected to the flow channel 155 as a specific example of the pressurizer 131 and a conductance valve 1313 to be connected to the flow channel 156. Then, the heater 132 is provided between the pressurizing pump 1311 and the conductance valve 1313.

The pressurizing pump 1311 takes in steam present in the flow channel 155 and discharges the taken-in steam to the heater 132 after pressurizing the taken-in steam. Therefore, the pressurizing pump 1311 serves as a pressure difference generation source that generates a pressure difference before and after the flow channel extending through that pump and serves as a start point of gas circulation in the circulation line 163.

The configuration of the pressurizing pump 1311 is not particularly limited. A dry pump can be employed, for example. By employing the dry pump, sterilization can be easily performed and maintainability is improved. The pressurizing pump 1311 may be further configured to be capable of controlling the r.p.m. In this embodiment, the r.p.m. of a motor 1312 that drives the pressurizing pump 1311 is variously controlled in accordance with a signal received from the controller 133. The control on the r.p.m. of the motor 1312 enables the evacuation ability of the pressurizing pump 1311 to be controlled.

The conductance valve 1313 is provided in a middle way of a flow channel extending from the heater 132 to the flow channel 156 or on the flow channel 156. Here, the conductance valve 1313 is an example of a flow channel diameter restrictor having a function of temporarily or continuously narrowing a flow channel diameter of the circulation line 163. The conductance valve 1313 is favorably a valve capable of switching the degree of opening between 0% and 100% in a non-stepwise manner.

The configuration of the flow channel diameter restrictor is not particularly limited to the conductance valve. For example, a manual valve that switches between full opening and half opening may be employed. In this embodiment, as shown in FIG. 1, an electric variable valve capable of adjusting the flow channel diameter is employed. The conductance valve 1313 variously controls the flow channel diameter in accordance with a signal received from the controller 133. Since the flow channel diameter is proportional to a ventilation volume, the flow rate of gas flowing through the circulation line 163 following the conductance valve 1313 (e.g., the flow rate of steam or gas flowing into the chamber 110) can be controlled at an arbitrary flow rate by variously controlling the flow channel diameter in this manner.

The controller 133 controls at least one of the pressurizing pump 1311 or the conductance valve 1313 in a manner that depends on a pressure of the heater 132. The controller 133 may be further configured to control an open valve 1323 to be described later. The controller 133 monitors an internal pressure of the heater 132 and sends, to the motor 1312, the conductance valve 1313, the open valve 1323, and the like, signals for controlling them.

The configuration of the controller 133 is not limited. For example, the controller 133 may be implemented by cooperation of an embedded operating system and an application specific integrated circuit (ASIC).

The heater 132 includes a heating element 1321, a heating controller 1322, the open valve 1323, and a drain 1324. The configuration of the heating element 1321 is not particularly limited. For example, the heating element 1321 only needs to generate heat by energization when voltage is applied thereon and transfer the heat to a medium (steam) inside the heater 132. The heating controller 1322 is constituted by a power supply that applies voltage to the heating element 1321 at a predetermined timing, for example. The heating controller 1322 may be controlled by the controller 133. The open valve 1323 functions as a relief valve which is opened when the internal pressure of the heater 132 exceeds a predetermined pressure (second pressure). The drain 1324 discharges condensed water, which can be generated when superheated steam flowing through the flow channel 155 is compressed by the pressurizer 131, outside the vacuum drying apparatus 1.

Figure 2:
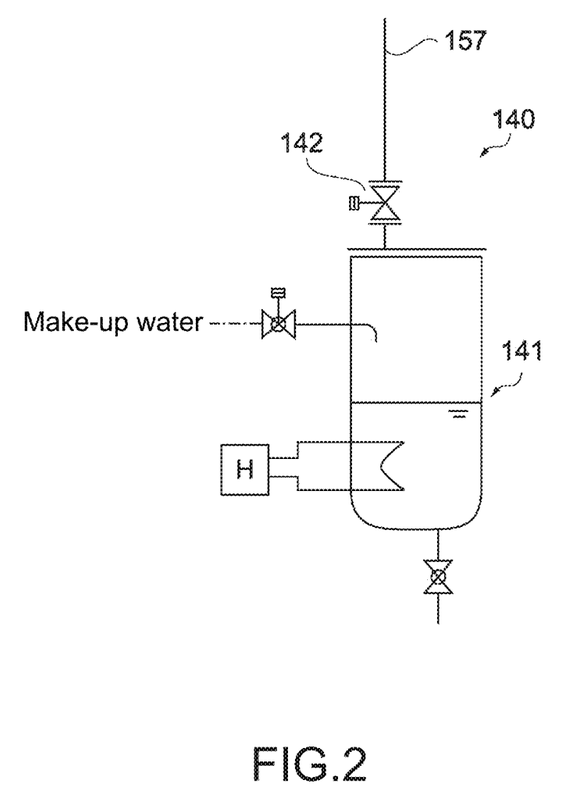
FIG. 2 is a diagram showing a circuit configuration example of a steam generating unit of FIG. 1.

FIG. 2 is a circuit configuration example of the steam generating unit 140. As shown in the figure, the steam generating unit 140 includes a boiler 141 and a conductance valve 142. The boiler 141 has a function of boiling water at a normal pressure, for example. The conductance valve 142 supplies steam generated by the boiler 141 into the flow channel 157.

Figure 3:
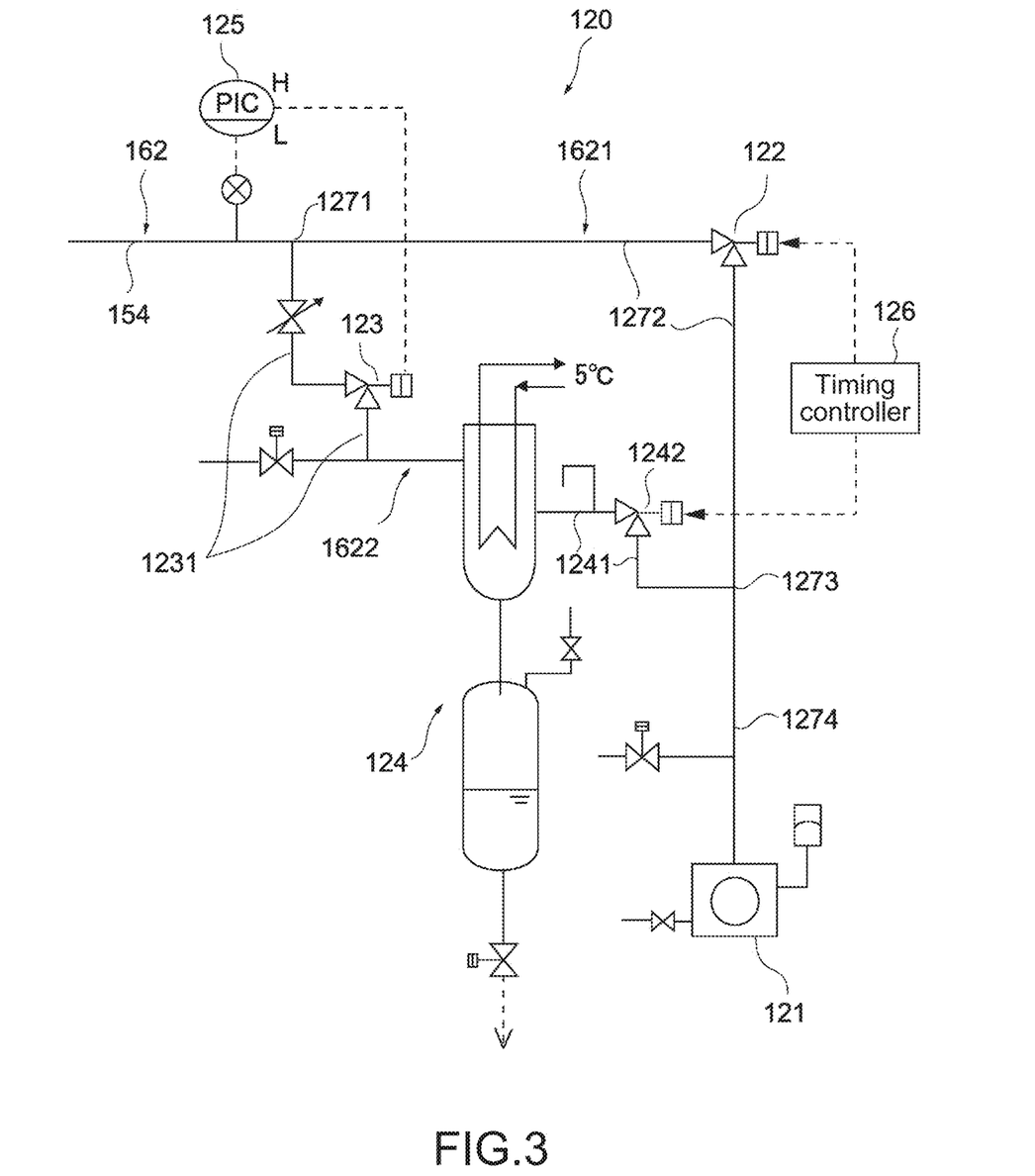
FIG. 3 is a diagram showing a circuit configuration example of a pressure reducing unit of FIG. 1.

FIG. 3 is a circuit configuration example of the pressure reducing unit 120. As shown in the figure, the pressure reducing unit 120 includes a vacuum pump 121 (second pump), a cooling unit 124, a first valve 122, a second valve 123, a pressure sensor 125, and a timing controller 126. The pressure reducing unit 120 further includes a flow channel 1272, a flow channel 1274, a flow channel 1241, and the like as flow channels that establish connection between the flow channel 154 and the vacuum pump 121.

The pressure reducing unit 120 includes a first evacuation line 1621 and a second evacuation line 1622 as the evacuation line 162. The evacuation line 162 is branched into the first evacuation line 1621 and the second evacuation line 1622 at a flow channel branching point 1271 of the flow channel 154.

The first evacuation line 1621 is constituted by the flow channel 1272 including the first valve 122 and the flow channel 1274. The first valve 122 may be constituted by a manual valve. In this embodiment, the first valve 122 is constituted by an electric open/close valve to be controlled by the timing controller 126.

The second evacuation line 1622 is constituted by a flow channel 1231 including the second valve 123, the flow channel 1241 including the cooling unit 124 and a third valve 1242, and the flow channel 1274. The first evacuation line 1621 and the second evacuation line 1622 are joined with each other at a flow channel junction point 1273. The third valve 1242 may be constituted by a manual valve. In this embodiment, the third valve 1242 is constituted by an electric open/close valve to be controlled by the timing controller 126.

The second valve 123 is selectively closed and opened in accordance with a high/low binary detection signal output by the pressure sensor 125.

The pressure sensor 125 is provided in the flow channel 154. The position at which the pressure sensor 125 is provided is not particularly limited. The pressure sensor 125 may be provided at any position as long as the pressure sensor 125 can detect a pressure of the treatment space inside the chamber 110. For example, the position at which the pressure sensor 125 is provided may be a position inside the chamber 110, may be a position on the flow channel 153, or may be a position on the flow channel 155.

When the pressure sensor 125 detects that the pressure of the treatment space of the chamber 110 exceeds the predetermined value, the second valve 123 receives a signal output from the pressure sensor 125 and is opened for making conduction of the second evacuation line 1622. Due to the conduction of the second evacuation line 1622, steam in the treatment space of the chamber 110 is discharged outside the vacuum drying apparatus 1 through the second evacuation line 1622. The steam is cooled and condensed by the cooling unit 124 in the middle way of the second evacuation line 1622. In a case where the vacuum pump 121 is of a type which cannot discharge steam, the vacuum pump 121 can be damaged when steam directly flows in the vacuum pump 121. In view of this, steam is made to pass through the second evacuation line 1622 and is condensed by the cooling unit 124. Accordingly, it is possible to protect the vacuum pump 121. In addition to this, it is also possible to inhibit steam from being discharged outside the vacuum drying apparatus 1.

On the contrary, when the pressure sensor 125 detects that the pressure of the treatment space of the chamber 110 drops below the predetermined value, the second valve 123 receives a signal output from the pressure sensor 125 and is closed for blocking the second evacuation line 1622.

The predetermined value related to the pressure of the treatment space of the chamber 110, which is used for open/close control on the second valve 123, is a target pressure (third pressure) during treatment in the treatment space of the chamber 110. The target pressure is set to be 1 to 10 kPa, for example.

Operation of Apparatus

Hereinafter, an operation of the vacuum drying apparatus 1 having the above-mentioned configurations will be described.

A typical operation of the vacuum drying apparatus 1 is divided into two successive stages. The first stage is blanching and sterilization treatment for deactivation of enzymes of the food 111 and heat sterilization of a surface of the food 111, an inner wall of the chamber 110, and the drying shelf 112. The second stage is superheated steam drying treatment for improvement of eating quality and preservability.

Description of Blanching and Sterilization Treatment

Figure 4:
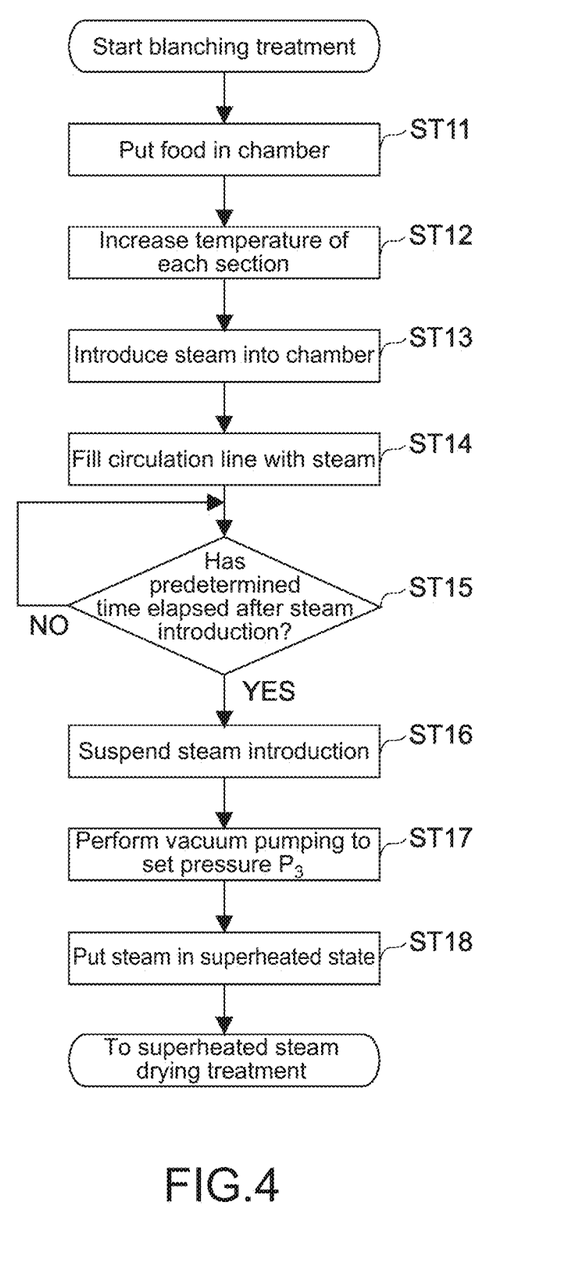
FIG. 4 is a flowchart showing blanching and sterilization treatment in the embodiment.
Figure 5:
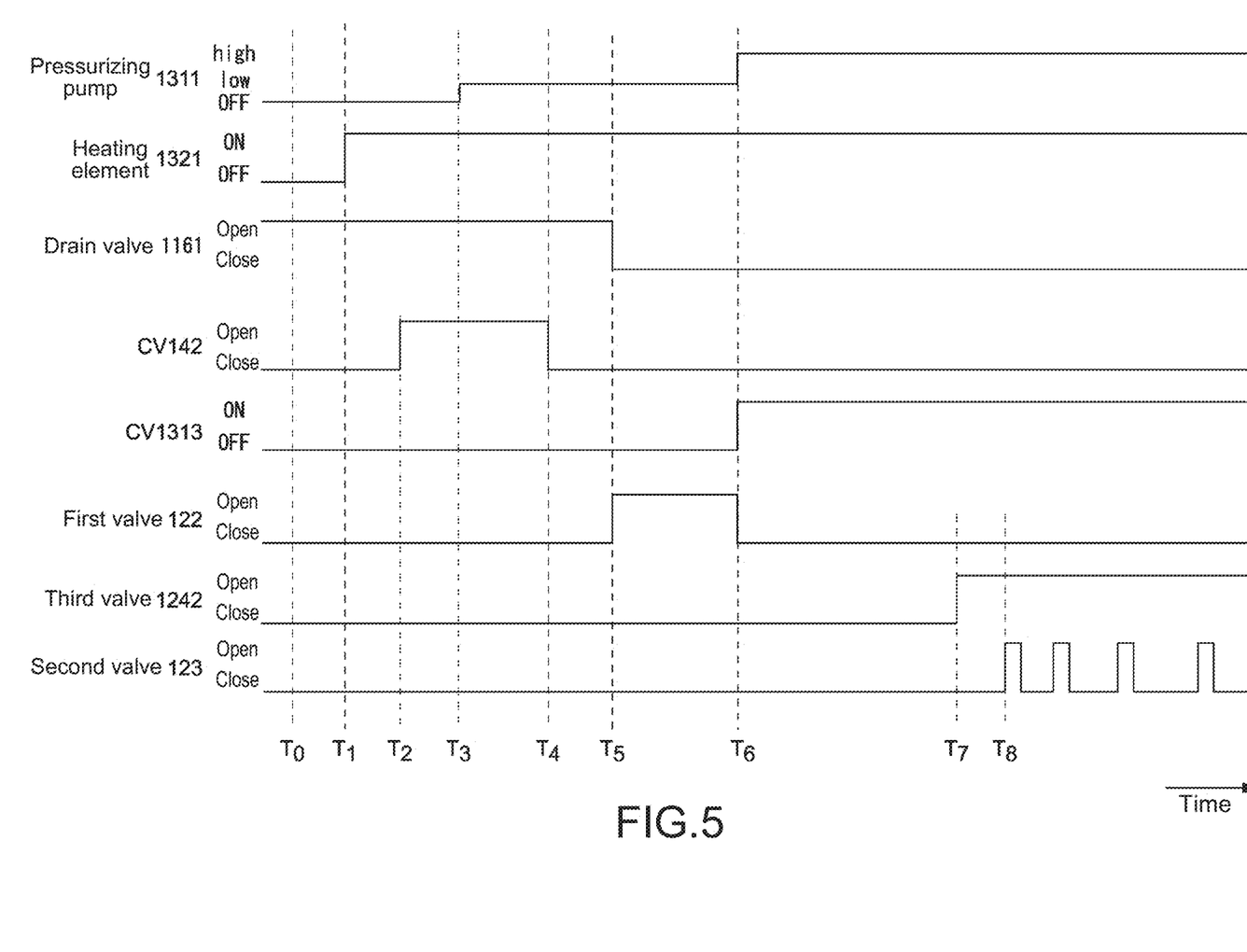
FIG. 5 is a timing chart of a vacuum drying apparatus according to the embodiment.

FIG. 4 is a flowchart showing a process of the blanching and sterilization treatment. On the other hand, FIG. 5 is a timing chart showing timings when the respective valves, pumps, and the like of the vacuum drying apparatus 1 operate in this embodiment. It should be noted that the OFF state of the conductance valve 1313 means a full opening state (100% ventilation) and the ON state means that flow rate control of the flow channel diameter restriction and ventilation gas are performed in a range of 0 to 100%.

As shown in FIG. 4, as an initial step at which the dried food is obtained from the food 111 by using the vacuum drying apparatus 1, the food is put in the chamber (ST11). When the food 111 is put in the chamber 110, the inside of the chamber 110 is at normal temperature and normal pressure. All pipes may contain the atmosphere at the normal temperature and normal pressure. Further, all the valves are held in the initial state. The initial state may be an opened state or may be a closed state. In this embodiment, as shown in T0 of FIG. 5, all the valves excluding the drain valve 1161 and the conductance valve 1313 are commonly held in the closed state as the initial state.

Next, increase in temperature is started by activating the heating element 1321 (ST12, T1). An object to be heated is gas inside the heater 132. Gas in the circulation line 163 circulates in a clockwise direction as shown as the arrows of FIG. 1. When steam introduced at ST13 which is the subsequent stage passes through the chamber 110 and the flow channel 153, the temperature is lowered due to the wall surface having a normal temperature. At this step, the increase in temperature is performed in the heater 132 in such a manner that the temperature of steam made to circulate in the chamber 110 and the temperature of steam introduced into the chamber 110 from the steam generating unit 140 are not separated from each other.

It should be noted that ST12 may be executed simultaneously with, in parallel to ST11. The increase in temperature of the step ST12 may be completed when the food is put in the chamber. Further, simultaneously accordingly ST12, the sheathed heater 113 may be activated and the wall surfaces of the flow channels 153, 155, 156, 157, and 158 may be warmed with a heater (not shown). The activation and the like of the sheathed heater 113 have a technical significance that condensation hardly occurs in the chamber 110 and the circulation line 163.

Next, steam is introduced into the chamber 110 from the steam generating unit 140 (ST13). In this embodiment, the conductance valve 142 is opened (T2). Then, when the drain valve 1161 is opened, steam generated by the steam generating unit 140 passes through the steam supply line 161 and arrives at and flows into the chamber 110.

At ST13, the pressurizing pump 1311 is activated (T3). By activation of the pressurizing pump 1311, the atmosphere originally put in the tube is replaced by steam. The operational strength of the pressurizing pump 1131 may be even low. That is, it is sufficient that the r.p.m. of the motor 1312 is low. By activating the pressurizing pump 1311, gas starts flowing in the circulation line 163 and the atmosphere contained in the flow channels 153, 155, 156, 157, and 158 is pushed by steam to the discharge destination of the drain 116. It should be noted that in this embodiment, the valve is not provided in a flow channel extending from the chamber 110 to the circulation line 163 and the conductance valve 1313 is also in the full opening state at a time (T2) of ST13.

In this manner, the circulation line 163 is filled with steam (ST14). The gas composition around the food 111 is in a state in which steam is close to 100%. Although the temperature of steam which should be subjected to convective heat transfer to the food 111 differs in a manner that depends on the kind and properties of the food 111, the temperature is set to be about 80° C. near the inlet 114 of the chamber 110 in the description example according to this embodiment. After ST14, steam keeps being blown to the food 111 for a predetermined time (from T1 to T4). If steam circulates around the food 111 or the temperature of the surface of the food 111 is below the steam temperature, heat transfers to the food 111 due to heat transfer in condensation and the food 111 rapidly increases in temperature.

As described above, in this embodiment, convective heat transfer continues being performed on the food 111 for a predetermined time under a steam environment of almost 100% and about 80° C. Accordingly, the heat sterilization of the surface of the food 111 can be performed. Further, deactivation of enzymes (blanching) of the food 111 can also be performed. It should be noted that as the temperature of steam blown to the food 111 and the duration (predetermined time from T1 to T4) of that time, optimal temperature and duration are favorably selected in accordance with the kind and properties of the food 111.

Next, if a predetermined time elapses after introduction of steam into the chamber 110 at ST13 (ST15/YES), the conductance valve 142 of the steam generating unit 140 is opened for suspending the steam introduction (ST16, T4). Accordingly, the blanching and sterilization treatment is terminated and vacuum pumping in the circulation line 163 is started as preparation for the superheated steam drying treatment which is the second stage (ST17).

In order to perform superheated steam drying treatment which is the second stage, an operation state of the vacuum drying apparatus 1 needs to be set to be a "steady state". As will be described later, regarding the "steady state", the pressure of gas inside at least the chamber 110 is set to be lower than the atmospheric pressure. Therefore, after the drain valve 1161 is put in the closed state, the pressure inside the circulation line 163 is reduced by the pressure reducing unit 120 (ST17, T5).

There are no limitations on the pressure reducing method by the pressure reducing unit 120. In this embodiment, the first valve 122 is opened in a state in which the vacuum pump 121 is activated (T5). That is, the first evacuation line 1621 is used. It should be noted that the circulation line 163 is filled with steam directly before T5 is executed, and thus the second evacuation line 1622 may be used in a case where steam is not discharged to a surrounding environment.

The pressure reduction by the pressure reducing unit 120 is performed until the pressure of gas inside the chamber 110 (measurement by the pressure sensor 125) is lowered to a pressure P4 higher than a target pressure P3 in the steady state. When the pressure inside the chamber 110 is lower to P4, the first valve 122 is closed and the pressure reduction by the pressure reducing unit 120 is suspended. At the same time, the conductance valve 1313 is turned on and the flow channel diameter restriction is started. At the same time, the operational strength of the pressurizing pump 1311 may be increased (ST18, T6).

The flow channel diameter of the circulation line 163 is restricted by the conductance valve 1313 at ST18. The amount of steam inside the pressurizing and heating unit 130, which flows out, is thus reduced. Meanwhile, the pressurizing pump 1311 is activated, and thus the pressure increases.

It should be noted that although the activation of the conductance valve 1313 is expressed as on and off (nonlinear) in FIG. 5, the conductance valve 1313 may be configured to linearly restrict the flow channel diameter.

The heating element 1321 keeps being activated. Therefore, heat is continuously added to steam circulating in the circulation line 163. After this state keeps, steam is put in a superheated steam state (ST18). The state in which superheated steam circulates in the circulation line 163 is the steady state of the vacuum drying apparatus 1. The previous state is a state of preparation for producing the steady state.

In addition, the controller 133 controls the opening degree of the conductance valve 1313 and controls the flow channel diameter, to thereby control the temperature and the pressure of superheated steam which circulates in the chamber 110 to arbitrary temperature and pressure (ST18). It should be noted that in addition to control on the flow channel diameter of the conductance valve 1313, the controller 133 may control the operational strength of the pressurizing pump 1311 to thereby control the pressure inside the pressurizing and heating unit 130.

Internal Pressure Control of Circulation Line 163 in Steady State

Also after entering the steady state, the pressure of gas in the circulation line 163 is constantly monitored by the pressure sensor 125. When the pressure inside the apparatus increases due to evaporation of water having the food 111, the pressure reduction is performed by the pressure reducing unit 120. In this embodiment, this pressure reduction is performed through the second evacuation line 1622. It is because the second valve 123 which is a valve that operates in conjunction with the pressure sensor 125 is provided on the side of the second evacuation line 1622. In a case where a valve that operates in conjunction with the pressure sensor 125 is provided in the first evacuation line 1621, such pressure reduction may be performed by the first evacuation line 1621.

After the first valve 122 is closed (T6), the third valve 1242 is opened (T7). Accordingly, the second evacuation line 1622 is evacuated by the vacuum pump 121. The pressure inside the chamber 110 becomes higher than a target pressure (third pressure) due to evaporation of water emitted from the food 111. In such a case, the second valve 123 is opened (T8). Accordingly, the pressure inside the chamber 110 is stably maintained at the third pressure or less. Further, accordingly, a phenomenon that moisture from the food 111 is added to gas inside the vacuum drying apparatus 1 and a steam partial pressure of gas inside the vacuum drying apparatus 1 balances can be inhibited.

In drying treatment with superheated steam which will be described below, such internal pressure control is automatically performed at an appropriate time. Therefore, superheated steam set at the arbitrary temperature/pressure at ST18 of FIG. 4 is not unbalanced and keeps drying the food 111 even when moisture is removed from the food 111 or it receives thermal energy from the heating element 1321.

Description of Drying Treatment with Superheated Steam

Hereinafter, the process in which the drying treatment with superheated steam is performed under the "steady state" mainly using currents of superheated steam inside the vacuum drying apparatus 1 will be described with reference to FIGS. 6 and 7.

Figure 6:
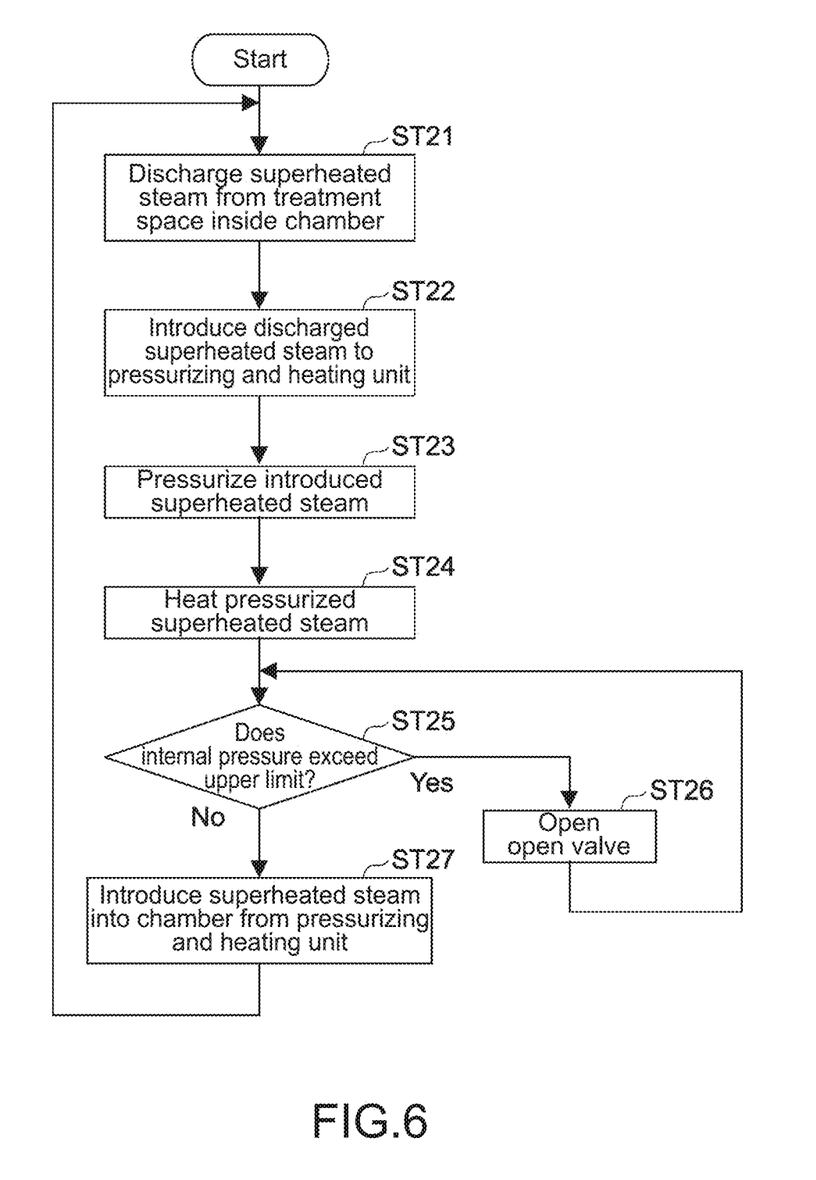
FIG. 6 is a flowchart showing superheated steam drying treatment in the embodiment.

FIG. 6 is a flowchart showing drying treatment with superheated steam in the steady state. The drying treatment will be described by describing circulation of superheated steam in order by using the outlet 115 of the chamber 110 as a start point. FIG. 7 is a diagram schematically showing state transition during a time when superheated steam circulates in the circulation line 163 once in the steady state.

Figure 7:
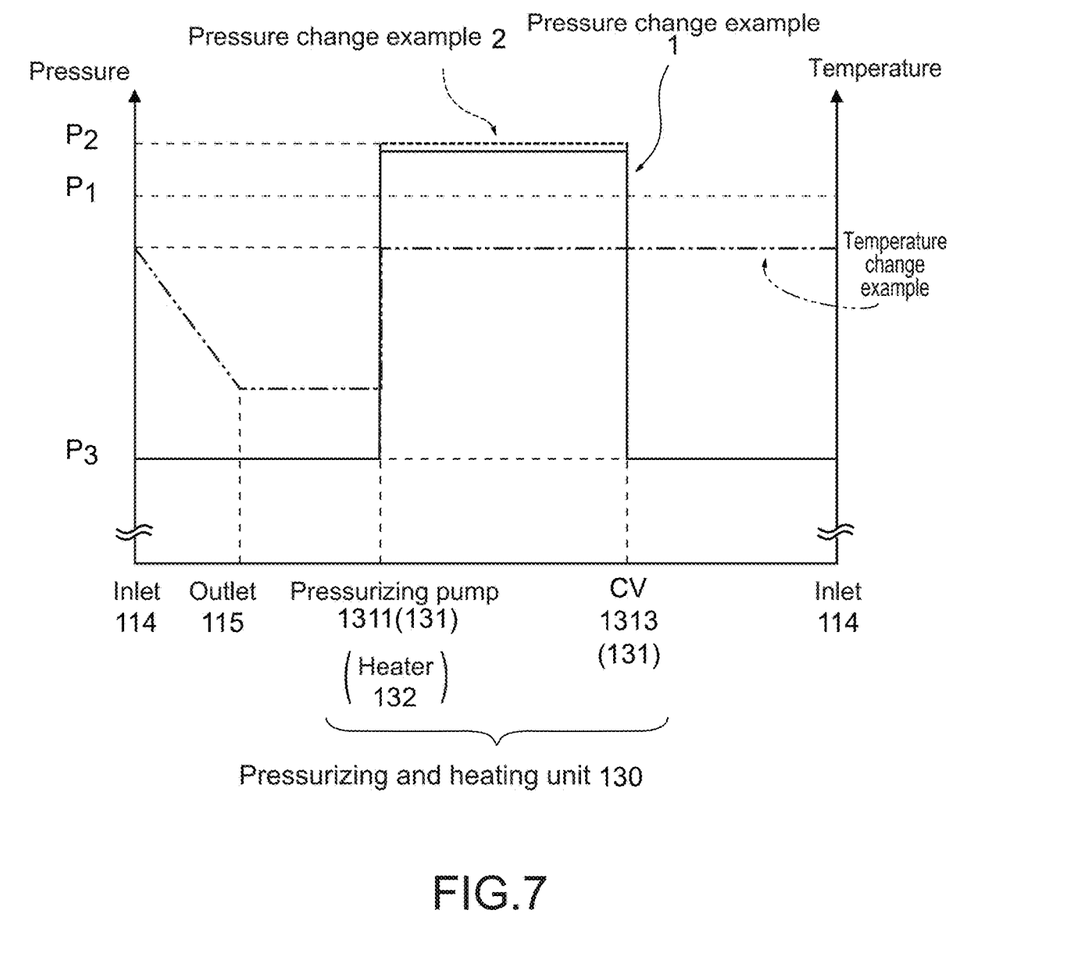
FIG. 7 is a diagram schematically showing state transition during a time when superheated steam circulates in a circulation line once in the superheated steam drying treatment.

In a preparation stage before the steady state shown in FIGS. 6 and 7, as mentioned above with reference to FIG. 5, the chamber 110 is evacuated by the evacuation line 162 (an example of an evacuation step) and steam or superheated steam is introduced into the chamber 110 through the steam supply line 161 and the circulation line 163 (an example of a first introduction step). Accordingly, at a time when the flow of FIG. 6 is started, the circulation line 163 is filled with superheated steam.

In such a state, the pressurizing pump 1311 is activated (or is active), and thus superheated steam in the treatment space inside the chamber 110 is discharged (ST21, an example of a discharge step).

The discharged superheated steam is introduced into the pressurizing and heating unit 130 through the circulation line 163, excluding part to be suctioned into the evacuation line 162 branching from the circulation line 163 at a flow channel branching point 151 (ST22). It should be noted that when both of the second valve 123 and the third valve 1242 are opened (at T8 of FIG. 5), part of superheated steam is suctioned into the evacuation line 162.

The pressurizing and heating unit 130 heats superheated steam introduced at ST22 in the pressurized state (ST23, ST24, an example of a heating step). The pressurized state is produced in such a manner that the pressurizer 131 pressurizes superheated steam introduced at ST22 to the first pressure (ST23, an example of a pressurizing step). As shown in FIG. 7, superheated steam exiting from the outlet 115 is fed into the heater 132 by the pressurizing pump 1311 that forms a part of the pressurizer 131. At that time, the volume of superheated steam which can flow into the flow channel 156 and the sections following the flow channel 156 is restricted by the conductance valve 1313. Therefore, the internal pressure of the heater 132 increases. Then, superheated steam in the state in which superheated steam is pressurized by the pressurizer 131 is heated by the heater 132. In this embodiment, as shown in FIG. 7, the pressure of superheated steam increases from a third pressure P3 to a pressure (first pressure) of P1 or more and P2 or less at the pressurizing and heating unit 130.

It should be noted that if the pressure increases more than expected, it leads to a failure of the apparatus. Therefore, a determination as to whether or not the internal pressure exceeds an upper limit P2 (second pressure P2) is made (ST25). If the internal pressure exceeds the upper limit (second pressure P2), the open valve 1323 is opened (ST26, an example of a pressure control step).

A pressure change example when the open valve 1323 is opened is shown in Pressure change example 2 of FIG. 7. In contrast, Pressure change example 1 shows an example when the open valve 1323 is not opened. The second pressure at which superheated steam outside the vacuum drying apparatus 1 is discharged is not limitative. For example, the second pressure is set to 1.1 atm or the like which is higher than the atmospheric pressure. Setting the second pressure to be higher than the atmospheric pressure enables steam to be easily discharged outside the vacuum drying apparatus 1.

When superheated steam heated by the heater 132 passes by the conductance valve 1313, the pressure is lowered to about the third pressure P3 as pressure drop while superheated steam is introduced into the chamber 110 in a state in which the temperature is kept constant (isentropic change) (ST27, an example of the second introduction step). The introduced superheated steam is not limitative. For example, superheated steam is introduced in a state of 0.01 atm and about 60° C.

Superheated steam introduced into the chamber 110 from the pressurizing and heating unit 130 is dry steam in a superheated state, which is obtained by additionally heating saturated steam, and thus the thermal conductivity is extremely higher as compared to the atmosphere and the like, for example. Therefore, the latent heat of vaporization, which is higher than that of air, can be applied to the food 111 and efficient drying can be performed.

In accordance with the vacuum drying according to this embodiment, the food 111 is dried with superheated steam, and thus a fixed quantity of moisture in the food 111 can be controlled within a constant range, which is totally different from freeze drying or the like in which drying is performed in such a manner that moisture is completely removed from the food 111. The drying treatment according to this embodiment is drying under an extremely low oxygen atmosphere as compared to a process in which the food is continuously exposed to cool air currents/warm air currents under an atmospheric composition environment, and thus lowering of the quality related to oxidation, for example, oxidation of lipid can be suppressed. Therefore, the quality of the food can be improved.

When superheated steam passes through the chamber 110, superheated steam adds latent heat of vaporization to the food 111. Therefore, the temperature is lowered. By the way, in this embodiment, superheated steam is introduced into the pressurizing and heating unit 130 again and is heated. At that time, since the flow from the pressurizing and heating unit 130 is limited by the conductance valve 1313, the pressure of superheated steam temporarily increases. Therefore, this embodiment can efficiently add the thermal energy to superheated steam.

Unlike the above-mentioned blanching and sterilization treatment, the pressure reduction is performed in such a manner that the pressure of superheated steam blown to the food 111 is equal to or lower than the atmospheric pressure. Drying at an arbitrary temperature can be performed. In this embodiment, drying at a desired temperature, for example, drying at 60° C. or drying at 30° C. can be performed in a manner that depends on the kind and properties of the food 111 and the purpose of processing.

Other Embodiments

The present technology is not limited to the above embodiment and various other embodiments can be realized.

For example, the sheathed heater 113 and the pressurizing and heating unit 130 as the means used for heating gas inside the vacuum drying apparatus 1 have been shown in the above embodiment. Another heating unit may be added to an arbitrary position of the circulation line 163.

Further, in addition to this, a configuration in which a coil heater may be wound around for heating the flow channel constituting the circulation line 163 in addition to the pressurizing and heating unit 130, for example, may be employed.

Figure 8:
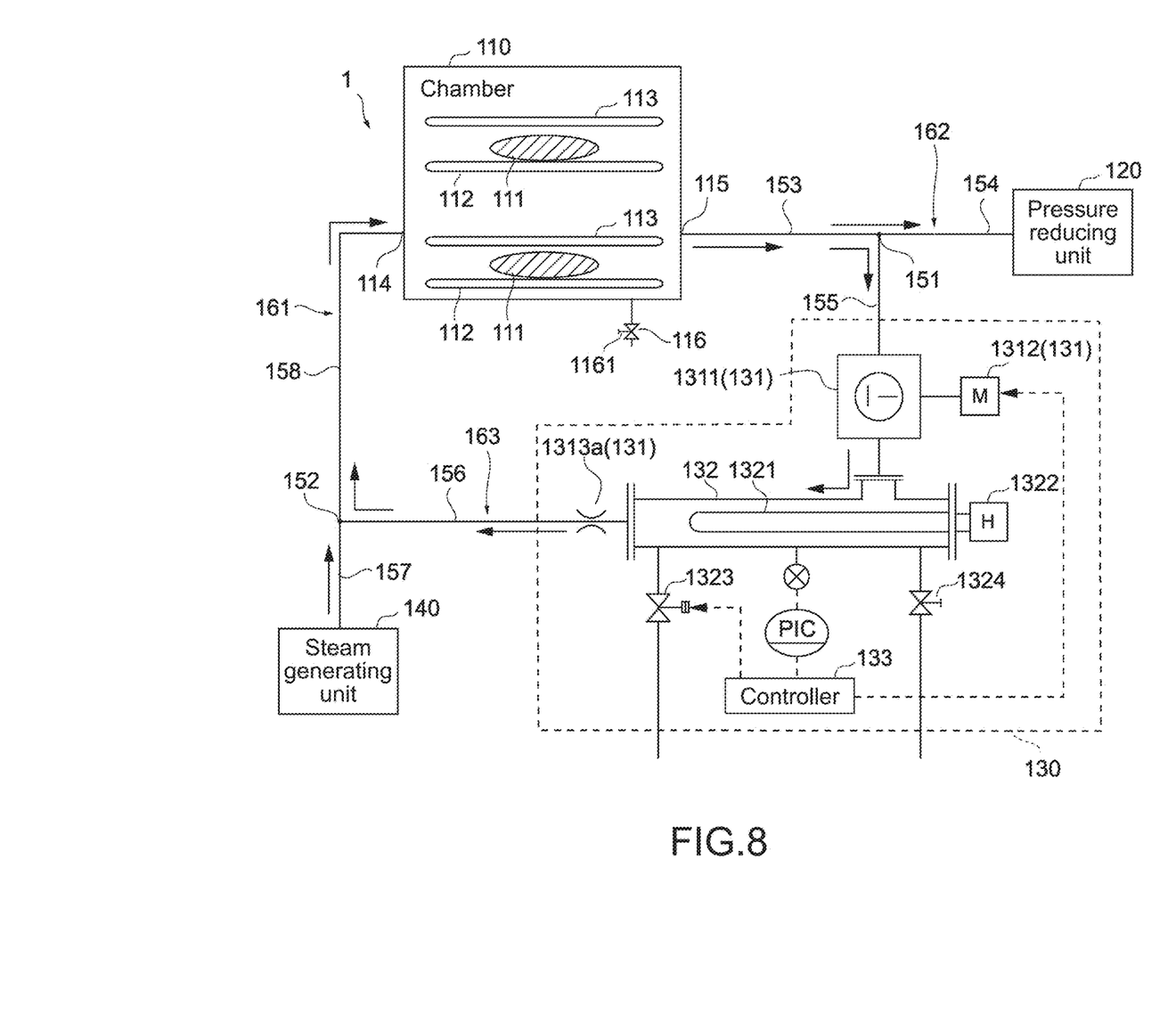
FIG. 8 is a diagram showing an apparatus configuration example of a drying apparatus for food according to a modified example of the embodiment.

Further, regarding the configuration inside the chamber 110, a plurality of drying shelves 112 on which the food 111 is to be disposed may be stacked. Further, the flow channel diameter restrictor constituting the pressurizer 131 is not limited to the electric variable valve shown as an example in the above embodiment and may be a fixed baffle plate, a throttle mechanism (orifice), or a venturi tube. FIG. 8 shows an apparatus configuration example of the vacuum drying apparatus 1 in which the plurality of drying shelves 112 is stacked and the flow channel diameter restrictor is constituted by a fixed throttle 1313*a*. Also with the vacuum drying apparatus as shown in FIG. 8, the action and effect similar to those of the above embodiment can be obtained.

Further, the example in which the circulation line 163 is outside the chamber 110 has been shown in the above embodiment. In other embodiments, a configuration in which the circulation line 163 is provided inside the chamber 110 may be employed. A configuration in which the entire circulation line 163 is incorporated in the chamber 110 may be employed or a configuration in which a part thereof, for example, the heater 132 is incorporated in the chamber 110 may be employed. The configuration in which the heater 132 is incorporated in the chamber 110 provides an effect that heat released from the wall surface of the heater 132 outside the vacuum drying apparatus 1 can be utilized for heating the chamber 110.

It should be understood by those skilled in the art that various modifications, combinations, sub-combinations and alterations may occur depending on design requirements and other factors insofar as they are within the scope of the appended claims or the equivalents thereof.

What is claimed is:

1. A vacuum drying apparatus, comprising:
    a chamber including an inlet, an outlet, and a treatment space capable of accommodating food;
    a steam supply line which is connected to the inlet and is configured to be capable of supplying steam into the treatment space;
    an evacuation line which is connected to the outlet and is configured to be capable of evacuating the treatment space;
    a circulation line which is provided outside the chamber and causes steam to circulate from the outlet to the inlet; and
    a pressurizing and heating unit which is provided in the circulation line and includes
        a pressurizer which includes a first pump and a flow channel diameter restrictor and pressurizes the steam,
        a heater which is provided between the first pump and the flow channel diameter restrictor and heats steam pressurized by the pressurizer, and
        a controller that controls at least one of the first pump or the flow channel diameter restrictor in accordance with a pressure of the heater,
    wherein the vacuum drying apparatus is configured to be capable of executing blanching treatment of causing steam to circulate between the treatment space at a normal pressure and the circulation line and drying treatment of causing steam to circulate superheated steam to circulate between the treatment space in which a pressure is reduced through the evacuation line and the circulation line.

2. The vacuum drying apparatus according to claim 1, wherein
    the pressurizing and heating unit
        heats steam through the heater in a state in which the flow channel diameter restrictor is fully opened when executing the blanching treatment, and
        heats steam through the heater in a state in which an degree of opening of the flow channel diameter restrictor is limited when executing the drying treatment.

3. The vacuum drying apparatus according to claim 1, wherein
    the pressurizing and heating unit further includes an open valve that discharges, when a pressure of steam pressurized by the pressurizer exceeds an upper limit pressure set in advance, the steam outside the vacuum drying apparatus.

4. The vacuum drying apparatus according to claim 1, wherein
    the evacuation line includes
        a second pump that discharges gas inside the treatment space outside the vacuum drying apparatus, and
        a valve that selectively opens and closes the evacuation line in such a manner that a pressure of the treatment space is constant.

5. A vacuum drying method, comprising:
    accommodating food in a treatment space inside a chamber;
    executing blanching treatment for the food by causing steam to circulate between the treatment space at a normal pressure and a circulation line which is provided outside the chamber and causes steam to circulate from an outlet to an inlet of the chamber;
    evacuating the treatment space through an evacuation line; and
    executing drying treatment for the food by causing superheated steam, which is obtained by heating steam discharged from the treatment space in a pressurized state by a pressurizing and heating unit provided in the circulation line, to circulate between the treatment space at a reduced pressure and the circulation line.

6. The vacuum drying method according to claim 5, wherein
    the step of executing drying treatment for the food further includes a pressure control step of performing control to inhibit a pressure of superheated steam pressurized by the pressurizing and heating unit from exceeding an upper limit pressure set in advance.

* * * * *